United States Patent
Park et al.

(10) Patent No.: US 6,399,287 B1
(45) Date of Patent: Jun. 4, 2002

(54) METHOD FOR FORMING FLUORESCENT FILM IN PDP BY USING A PHOTOPOLYMERIZABLE PHOTOSENSITIVE PHOSPHOR PASTE COMPOSITION

(75) Inventors: Lee Soon Park, Tae-Kwangyokshi; Hyun Shik Oh, Kyongsangnam-do, both of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/383,634

(22) Filed: Aug. 26, 1999

(30) Foreign Application Priority Data

Aug. 29, 1998 (KR) .............................. 98-35396

(51) Int. Cl.⁷ .................................. H01J 1/64
(52) U.S. Cl. .......................... 430/321; 445/24
(58) Field of Search ................... 430/281.1, 270.1, 430/321; 445/24

(56) References Cited

U.S. PATENT DOCUMENTS 5,792,589 A * 8/1998 Udagawa et al. ........ 430/270.1
5,973,034 A * 10/1999 Mori et al. .................. 523/458

FOREIGN PATENT DOCUMENTS

| JP | 04116558 | 4/1992 | |
| JP | 4-116558 | * 4/1992 | |
| JP | 06348013 | 12/1994 | |
| JP | 10168108 | 6/1998 | |
| JP | 10186643 | 7/1998 | |
| JP | 11125901 | 5/1999 | |
| JP | 11329236 | 11/1999 | |
| JP | 11338132 | 12/1999 | |

OTHER PUBLICATIONS

English Language Translation of JP 4–116558, Ogawa et al., Apr. 1992.*

* cited by examiner

Primary Examiner—John A. McPherson
(74) Attorney, Agent, or Firm—Fleshner & Kim, LLP

(57) ABSTRACT

Photopolymerization type photosensitive phosphor paste composition useful for formation of a fluorescent film in a plasma display panel which is one of flat panel display, and method for forming a fluorescent film in a plasma display panel by using the same, the composition consisting of a binder polymer, a multifunctional monomer or oligomer, an UV photosensitizer, a flourescent material, a solvent, additives and dispersant, whereby, different from the related art photosensitive flourescent paste, as the photopolymerization type photosensitive flourescent paste of the present invention can be developed by pure water, the paste is environment friendly and has a low baking temperature, that permits an easy flourescent film formation, the present invention is suitable for formation of a flourescent film for a large sized screen over 40" and an HDTV PDP.

5 Claims, 3 Drawing Sheets

METHOD FOR FORMING FLUORESCENT FILM IN PDP BY USING A PHOTOPOLYMERIZABLE PHOTOSENSITIVE PHOSPHOR PASTE COMPOSITION

BACKGROUND OF THE INVENTION

1. Field of the Invention

The present invention relates to a photopolymerization type photosensitive flourescent paste composition and a method for forming a fluorescent film by using the same, and more particularly, to a photopolymerization type photosensitive phosphor paste composition useful for formation of a fluorescent film in a plasma display panel which is one of flat panel display, and a method for forming a fluorescent film in a plasma display panel by using the same.

2. Background of the Related Art

Being one of flat panel displays utilizing a phenomenon in which a vacuum UV ray(a wavelength approx. 147 nm) emitted from plasma formed at discharge of an inert gas is turned into red, green and blue lights within a visible light range when the UV ray makes collision onto red, green and blue flourescent films, the plasma display panel(called as 'PDP' hereafter) is paid attention as one of the next generation displays, such as HDTV, in view that the PDP can make a full color display, has a fast response and a wide angle of view, and is easy to realize a large sized display over 40". The fluorescent film in the PDP has thin films of fluorescent materials which can emit red, green, and blue colors respectively coated inside of space surrounded by a barrier with a height 150 $\mu$m at every 200 nm~300 nm formed on a lower glass substrate of the PDP, makes the full color of the PDP available, and is an important component which fixes a quality of the PDP as the flourescent film controls a luminance of the panel. The PDP fluorescent film is to be formed by screen printing and photolithgraphy. However, the screen printing has a problem in that a small contact area between a screen mask and the glass substrate makes it difficult that a uniform thickness is obtained on the barrier sides and the glass substrate unless a special care is taken for controlling a fluidity of the flourescent paste. Particularly, in a case of an HDTV PDP with a size larger than 40", it is very difficult to apply a uniform coat of flourescent paste between barrier precisely throughout the glass substrate by the screen printing. Eventually, a photolithography using a liquid photosensitive flourescent paste is suggested as a screen printing method suitable for a large sized HDTV PDP.

As a material for forming the PDP flourescent film by the photolithography, a PVA-ADC type photosensitive flourescent paste is suggested in U.S. Pat. No. 5,086,297 in 1989, which is prepared by dissolving ammonium dichromate(call as 'ADC' hereafter) in a water solution of polyvinyl alcohol (call as 'PVA' hereafter) used in formation of a flourescent film in a color TV CRT, and dispersing flourescent material therein. However, since a structure and materials of the PDP are different from the TV CRT, the dichromate residue degrades the PDP flourescent material and drops a luminance during operation of the PDP. And, U.S. Pat. No. 5,136,207 in 1990 and U.S. Pat. No. 5,601,468 in 1996 suggest use of a PVA-DAST type photosensitive flourescent paste in formation of the PDP flourescent film, which is prepared by dissolving 4,4'-diazidostilbene-2,2'-disulfonic acid sodium salts, one of water soluble photosensitive agents, in PVA water solution and dispersing flourescent material. However, as developments of the PDP advance, there have been problems in that formation of a uniform flourescent film is difficult because, not only formation of a reflection type flourescent film on a PDP panel with a non-flat structure, of a photo cross-linking photosensitive paste, such as PVA-ADC and PVA-DAST is difficult, but also the photo cross-linking photosensitive paste has a weak adhesive force. And, a photopolymerization type photosensitive flourescent paste using acrylate group polymer having carboxyl group as a binder is known, the paste has disadvantages in that a high baking temperature is required after formation of the flourescent film, residual inorganic alkali metals gives an influence to the flourescent material after the development, and the alkali development solution causes environmental pollution.

The foregoing related art photo cross-linking type photosensitive flourescent paste will be explained in more detail. FIG. 1 illustrates a photoreaction mechanism of the related art photo cross-linking type photosensitive flourescent paste of PVA-ADC, schematically. FIG. 2 illustrates a photoreaction mechanism of the related art photo cross-linking type photosensitive flourescent paste of PVA-DAST, schematically.

The related art photo cross-linking type photosensitive flourescent paste of photosensitive polymer composition, such as PVA-ADC and PVA-DAST, is prepared by dissolving PVA-ADC or PVA-DAST which induces a photo cross-linking reaction in water, a solvent, arid dispersing one of red, green, and blue flourescent material powder therein, wherein the fluorescent material powder is included in the photosensitive flourescent paste by 20~30 wt %, the water, a solvent. by 20~30 wt %, with balance of PVA-ADC or PVA-DAST. Upon coating and drying the photosensitive flourescent paste on the glass substrate having the barriers formed thereon, most of the water, a solvent, is vaporized, and the photosensitive polymer composition of PVA-ADC or PVA-DAST encapsulate the flourescent powder, to form micron grains of diameters ranging 3 $\mu$m~6 $\mu$m, which are stacked to form a composite membrane of flourescent material photosensitive polymer of a thickness ranging approx. 20~30$\mu$m. Upon directing an UV ray to the composite membrane of flourescent material/photosensitive polymer with a mask placed thereon, an exposed portion is altered into megapolymer groups of three dimensional network structure by a photo cross-linking reaction of a mechanism as shown in FIGS. 2 and 3, and becomes insoluble in water, to remain during the development, while portions not exposed are removed, permitting to form a desired flourescent material pattern. In this instance, as shown in FIG. 1, in the PVA-ADC group photoreaction mechanism, a Cr(VI) ion included in the ADC is altered into Cr(III) ion by the UV ray to form a complex with an —OH in PVA, resulting to form a megapolymer group which is not soluble in water, which is a solvent. And, as shown in FIG. 2, in the PVA-DAST group photoreaction mechanism, DAST which is a water soluble photosensitive agent is decomposed by an UV ray, to form nitrene groups, which makes a hydrogen abstraction reaction with PVA, a polymer, to form a photo cross-linked polymer, to become insoluble in water, a development liquid. Thought he photo cross-linking photosensitive flourescent paste of a photosensitive polymer composition, such as PVA-ADC or PVA-DAST is applicable in formation of flourescent film in a color TV CRT with a thickness ranging 10 $\mu$m, the paste is not applicable in formation of the PDP flourescent film having a thickness ranging 20~30 $\mu$m before exposure due to a poor adhesive force coming from a difference of cross-linking densities. This is because the cross-linking density is varied with a number of chrome ions in DAST or ADC, a photosensitive agent, in the photo cross-linking photosensitive flourescent paste, which makes a direct bonding with PVA, a polymer, and such reaction can be occurred only when an UV ray is directed onto photosensitive agents, such as DAST and Cr(VI), directly.

Therefore, as a photo energy of an UV ray becomes the less due to absorption and reflection by the flourescent material grains as the film goes the thicker, the cross-linking may not be occurred or inadequate due to lack of the photo energy of the UV ray at a portion the film is required to make bonding to the substrate. Therefore, the contact portion, which is the deepest portion of the film, between the glass substrate and the flourescent film remained in a state not being cross-linked is bulged or dissolved by a development liquid during a development, leading to lost an exposed flourescent portion which should be remained.

SUMMARY OF THE INVENTION

Accordingly, the present invention is directed to a photopolymerization type photosensitive phosphor paste composition, and a method for forming a fluorescent film in a plasma display panel by using the same that substantially obviates one or more of the problems due to limitations and disadvantages of the related art.

An object of the present invention is to provide a photopolymerization type photosensitive phosphor paste composition, and a method for forming a fluorescent film in a plasma display panel by using the same, which has a low baking temperature after formation of flourescent film and is easy to form a flourescent film of a non-flat type for a PDP of AC or DC type.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings To achieve these and other advantages and in accordance with the purpose of the present invention, as embodied and broadly described, the photopolymerization type photosensitive flourescent paste composition consists of a binder polymer which can be developed by pure water, a multifunctional monomer or oligomer, a photosensitizer which can make a photoreaction by an UV ray, a flourescent material, a solvent for dissolving the binder polymer, additives, and pure water.

In other aspect of the present invention, there is provided a method for forming a flourescent film in a PDP by using a photopolymerization type photosensitive flourescent paste composition, including the steps of (1) preparing red, green and blue photopolymerization type photosensitive flourescent paste composition consisting of water soluble binder polymer 1~15 wt %, multifunctional monomer or oligomer 3~7 wt %, photoinitiator 1~3 wt %, a solvent which can dissolve the binder polymer 20~35 wt %, additive 0.1~1 wt %, pure water, and flourescent material 25~35 wt % respectively, (2) coating one of the prepared red, green and blue photopolymerization type photosensitive flourescent paste compositions on a glass substrate having barriers formed thereon, (3) drying the coated composition, (4) exposing the dried composition and developing with pure water to form a first flourescent film, (5) processing the steps (2), (3) and (4) on one of the rest two photopolymerization type photosensitive flourescent paste compositions, to form a second flourescent film, (6) processing the steps (2), (3) and (4) on a finally remained Photopolymerization type photosensitive flourescent paste composition, to form a third flourescent film, and (7) baking the glass substrate having the first, second and third flourescent films formed thereon.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
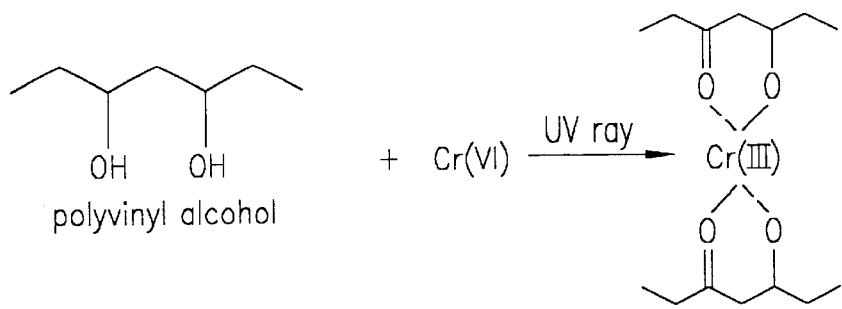
FIG. 1 illustrates a photoreaction mechanism of a related art photo cross-linking type photosensitive flourescent paste of PVA-ADC, schematically.
Figure 2:
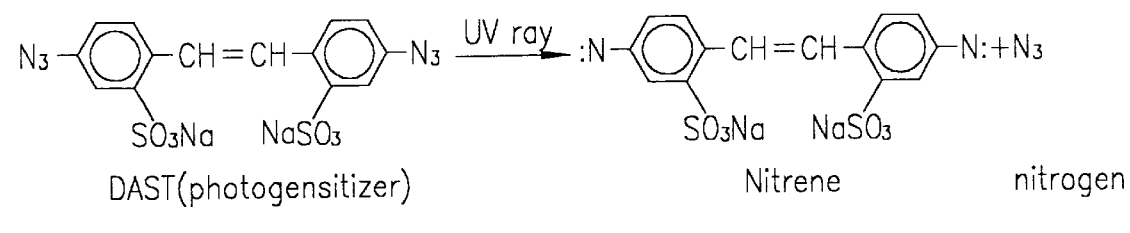
FIG. 2 illustrates a photoreaction mechanism of a related art photo cross-linking type photosensitive flourescent paste of PVA-DAST, schematically.
Figure 2:
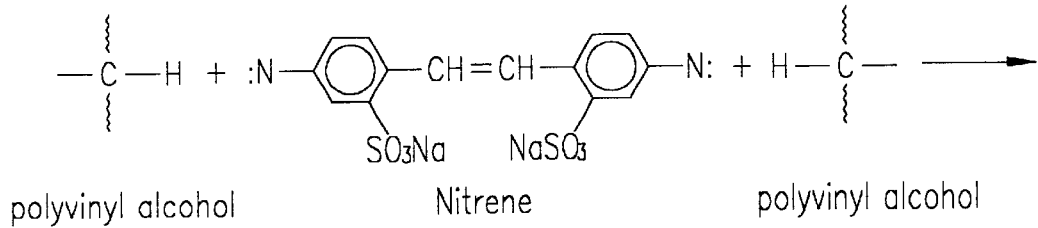
Figure 2:
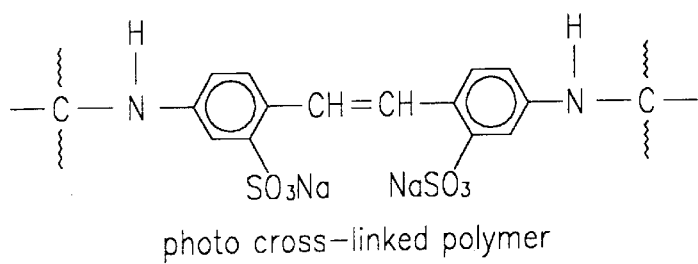

Reference will now be made in detail to the preferred embodiments of the present invention, examples of which are illustrated in the accompanying drawings. A Photopolymerization type photosensitive flourescent paste composition formed in accordance with a preferred embodiment of the present invention consists of water soluble binder polymer 1~15 wt %, multifunctional monomer or oligomer 3~7 wt %, photoinitiator 1~3 wt %, flourescent material 25~35 wt %, a solvent which can dissolve the binder polymer 20~35 wt %, additives, such as dispersant, smoother or photosensitizer, 0.1~1 wt %, and a balance of pure water.

The water soluble binder polymer may be selected from a group including pure water or organic solvent soluble cellulose group derivatives, such as hydroxyethyl cellulose, hydroxypropyl cellulose, ethylhydroxyethyl cellulose, hydroxyalkylmethyl cellulose, hydroxyethylhydroxypropyl cellulose and dihydroxypropyl cellulose, or water soluble copolymers containing water soluble monomers, such as acrylamide, diacetone acrylamide and vinyl pyrrolidinone, or water soluble copolymers containing oil soluble monomers, such as methylmethaccrylate and α-methylstyrene. The water soluble binder polymer may also include a cellulose group derivative soluble in water and organic solvent, and a water soluble copolymer containing either a water soluble monomer or an oil soluble monomer. The binder polymer may be selected from pure water or organic solvent soluble cellulose group derivatives, preferably from polymers having a molecular weight ranging 10,000~500,000 g/mole, with a kinetic viscosity of 20,000~40,000 cps when coated on an entire surface, and 100,000 cps during storage. If the molecular weight is too low, a binder polymer content in the photosensitive fluorescent paste should be adjusted for adjustment of fluidity characteristics, wherein an increased binder polymer content may cause a problem of prolonged baking time period and a decreased binder polymer content may cause a problem of deteriorated storage stability, such as precipitation of inorganic fluorescent material for a prolonged storage. And, a too high molecular weight of the binder polymer may cause problems of deterioration of solubility to a solvent as well as deterioration of wettability and dispersability to inorganic fluorescent material grains, and a too low molecular weight of the binder polymer may cause problems of prolonged baking time period or higher baking temperature, that deteriorates compactness of the fluorescent film after the baking, to require an increased binder polymer content for the photosensitive paste to have an appropriate viscosity. And, a too low viscosity of the binder polymer may cause problems of uneven coating of the fluorescent paste on a barrier sidewall surface to result to lie in a heap on an underlying glass substrate, and a too high viscosity of the binder polymer may cause a problem of causing a thickness difference due to concentration of the fluorescent paste at a top portion of the barrier coming from a poor flowability.

The multifunctional monomer or oligomer may be selected from a group including multifunctional monomers, such as ethyleneglycol diacrylate, diethyleneglycol diacrylate, methyleneglycol bisacrylate, propylene diacrylate, 1,2,4-butanetriol triacrylate, 1,4-benzenediol diacrylate, trethylolpropane triacrylate, trimethylolpropane tiethacrylate, pentaerythritol tetraacrylate, pentaerythritol tetramethaacrylate, dipentaerythritol hexaacrylate and dipentaerythritol hexamethaacrylate, and multifunctional oligomers, such as melamine acrylate, epoxy acrylate, urethane acrylate, polyester acrylate, polyethylene glycol bisacrylate with a molecular weight ranging 200~500 and polypropylene glycol bismetaacrylate with a molecular weight ranging 200~500. As the epoxy acrylate oligomer, Ebecryl 600, 605, 616, 639 and 1608 are commercially available from UCB, as aliphatic urethane acrylate oligomer, Ebecryl 264,265, 284 and 8804 are available, as aromatic urethane acrylate oligomer, Ebecryl 220,4827 and 4849 are available, and as polyester acrylate oligomer, Ebecryl 80 and 150 are commercially available.

As the photoinitiator, any of photoinitiators that exibits an excellent photoreaction in an UV wavelength range may be used, for example, 2,4-dimethoxy-2-phenyl acetophenone (called as 'DMPA' hereafter) may be used singly or as a composition of a mixture photoinitiator having more than two photoinitiators mixed therein. As a cross-linking capability can be provided for various wavelength ranges, the mixture photoinitiator can provide an excellent flourescent film pattern. Therefore, photoinitiators, such as 1-hydroxycyclohexyl-phenylketone, p-phenylbenzophenone, benzyldimethylketal, 2,4-dimethyl thioxanthone, 2,4-diethyl thioxanthone, benzoin ethyl ether, benzoin isobutyl ether, 4,4'-diethylaminobenzophenone and p-diethyl amino benzoic acid ethylester, or a mixture of two or more than two of them may be used as the photoinitiator.

As the flourescent material, $Y_2O_3$:Eu, $Y_2SiO_5$:Eu, $Y_3Al_5O_{12}$:Eu, $Zn_3(PO_4)_2$:Mn, $YBO_3$:Eu, $(Y,Gd)BO_3$:Eu, $GdBO_5$:Eu and $ScBO_3$:Eu may be used for red color, $Y_2SiO_5$:Ce, $CaWO_4$:Pb and $SaMgAl_{14O23}$:Eu may be used for blue color, and $Zn_2SiO_4$:Mn, $BaAl_{12}O_{19}$:Mn, $SrAl_{13}O_{19}$:Mn, $CaAl_{12}O_{19}$:Mn, $YBO_3$:Tb, $BaMgAl_{14}O_{23}$:Mn, $LuBO_3$:Tb, $ScBO_3$Tb and $Sr_6Si_3O_8C_{14}$:Eu may be used for green color, and, other than these, any flourescent materials that can emit red, green, or blue visible lights may be used.

The solvent for the photosensitive flourescent paste may be selected from a group including N-methyl pyrrolidone, ethylene glycol, 2-butoxy ethoxy ethanol, cellosolve, 2-ethoxy ethanol, 3-methoxy-3-methyl butanol, terpineol and dimethyl formamide and dimethyl acetamide, which have a boiling higher than 100° C., or mixtures of two or more than two of them.

As the additives, a photosensitizer such as benzophenone may be used for improving a fluidity characteristics and forming process of the photosensitive flourescent paste, and hydroquinone group UV stabilizer, acryl group dispersant such as alcosperse 602-N. silicon group anti-foamer such as BYK 307, smoother such as BYK 320 or HS-70 from SK-UCB, anti-oxidant such as Iganox 1010 from Cyba geiga, and polymerization inhibitor such as hydroquinone monomethyl ether(MEHQ) and the like may be used.

Thus, the photopolymerization type photosensitive flourescent paste consists of one of red, green and blue flourescent material, binder polymer for binding the flourescent material, multifunctional monomer or oligomer participating in photopolymerization, UV ray photoinitiator, solvent and additives, and is featured in that development by pure water is possible. That is, upon coating and drying the photopolymerization type photosensitive flourescent paste on the PDP. glass substrate having barriers formed thereon, the solvent is vaporized and eliminated, to form a flourescent material/photosensitive polymer composite membrane consisting of flourescent material, binder polymer, multifunctional monomer or oligomer, photosensitizer and the like. Upon direction of an UV ray to the composite membrane through a mask, the photoinitiator is decomposed, to form a free radical which makes double bonding polymerization of the multifunctional monomer or oligomer distributed between the binder polymer surrounding micron flourescent grains, to form a three dimensional network of polymer groups, which is not soluble in a solvent, in the composite membrane. Different from the photo cross-linking type photosensitive flourescent paste, such as PVA-DAST, in the photopolymerization type photosensitive flourescent paste of the present invention, because a Photopolymerization reaction is occurred under a chain polymerization reaction mechanism owing to residual radicals formed by decomposition of the photoinitiator by an UV ray at portions, not only just beneath a surface of the flourescent grain, but also just above the glass substrate to which the UV ray reaches with difficulty, a thick flourescent film pattern suitable for a PDP can be obtained with easy.

The role of the binder polymer which acts as a binder of the flourescent material is very important in the photopolymerization type photosensitive flourescent paste of the present invention, While the binder polymer in the Photopolymerization type photosensitive flourescent paste of the present invention does not participate in photopolymerization reaction at all, in the case of the related art photo cross-linking type photosensitive flourescent paste, such as PVA-ADC or PVA-DAST, PVA, acting as a binder polymer, participates in photoreaction, together with DAST or Cr(III), directly. And, in preparation of the photopolymerization type photosensitive flourescent paste composition of the present invention, the development process varys with kinds of binder polymers. It is preferable that the binder polymer is soluble both in water solution and organic solvent, particularly, one that is soluble in pure water is favorable in view of cost, working environment, and environmental pollution because use of pure water as a development liquid is allowed. In a case when an acrylate group polymer having carboxyl group is used as the binder, there can be a problem in that the flourescent material may be contaminated by residual alkali metal because a strong alkali solution, such as NaOH, should be used in development.

Figure 3:
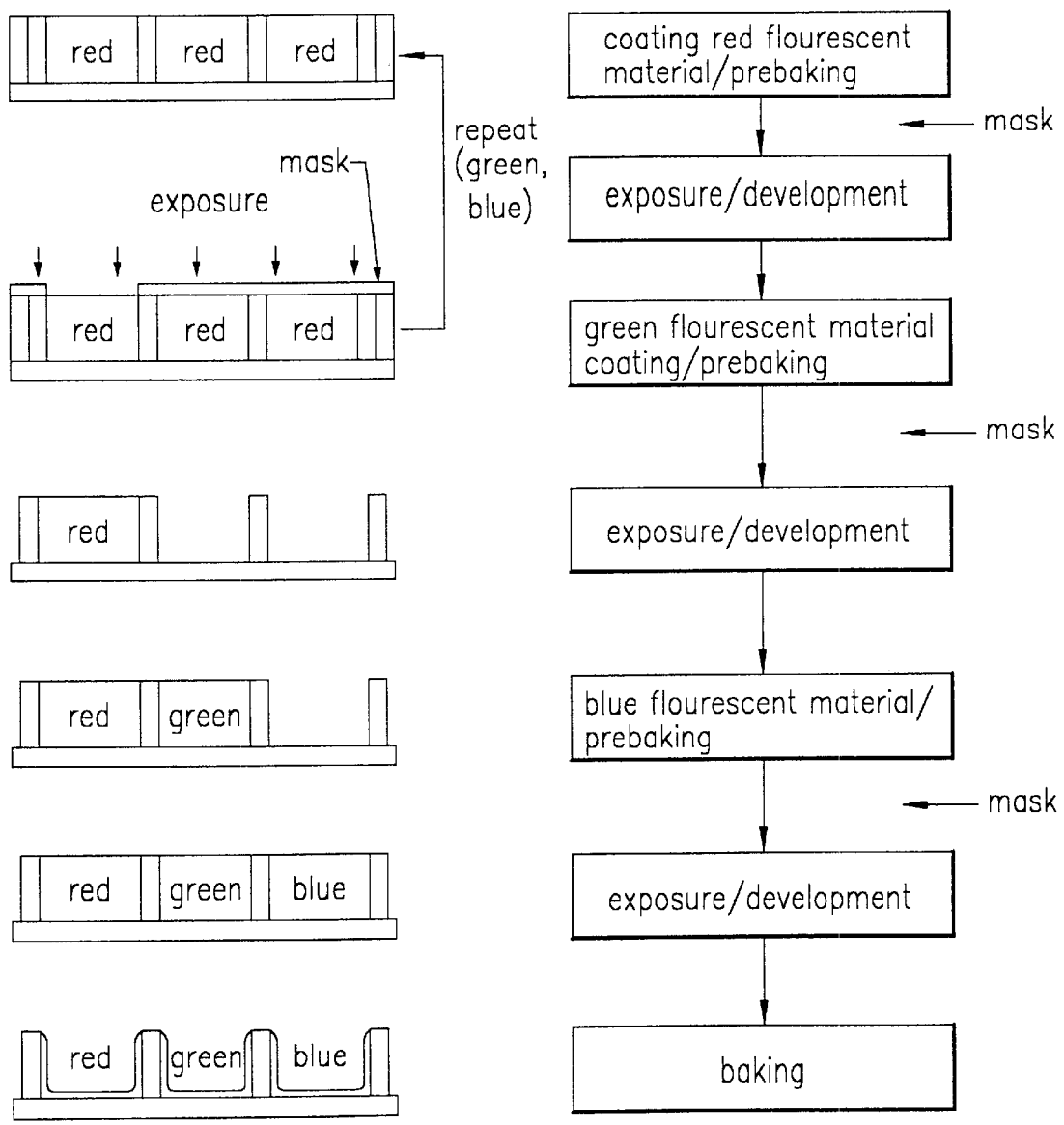
FIG. 3 schematically illustrates the steps of a method for forming a flourescent film in a PDP by photolithography using a photopolymerization type photosensitive flourescent paste composition formed in accordance with a preferred embodiment of the present invention; and, FIG. 4 illustrates a thermal analysis graph showing thermal decomposition characteristics of binder polymer used for a photopolymerization type photosensitive flourescent paste formed in accordance with a preferred embodiment of the present invention.

A method for forming a fluorescent film in a PDP by using the photopolymerization type photosensitive flourescent paste composition of the present invention will be explained. FIG. 3 schematically illustrates the steps of a method for forming a flourescent film in a PDP by photolithography using a photopolymerization type photosensitive flourescent paste composition formed in accordance with a preferred embodiment of the present invention.

Referring to FIG. 3, the method for forming a flourescent film in a PDP by using a photopolymerization type photosensitive flourescent paste composition formed in accordance with a preferred embodiment. of the present invention includes (1) a coating step for coating photopolymerization type photosensitive flourescent paste composition on a glass substrate having barriers formed thereon to a thickness ranging 30~70 $\mu$m, which paste composition consists of water soluble binder polymer 1~15 wt %, multifunctional monomer or oligomer 3~7 wt %, photoinitiator 1~3 wt %, one of red, green and blue flourescent materials 25~35 wt %, a solvent which can dissolve the binder polymer 20~35 wt %, additives, such as dispersant, smoother or photosensitizer, 0.1~1 wt %, and a balance of pure water, (2) a drying step for heating and drying at a temperature ranging 100~140° C. for 10~30 min., (3) a first flourescent film forming step having an exposing step for aligning a mask and exposing the dried paste composition for 20~60 seconds and a development step for developing the paste composition on the glass substrate using pure water, (4) a second flourescent film forming step for repeating the steps (1) to (3) using the photopolymerization type photosensitive flourescent paste composition containing a flourescent material of a color different from the flourescent material used in the steps (1) to (3), (5) a third flourescent film forming step. for repeating the steps (1) to (3) using a photopolymerization type photosensitive flourescent paste composition containing a flourescent material of a color not used in the foregoing steps, (6) a baking step for heating and baking the glass substrate having flourescent films of red, green and blue colors formed thereon at a temperature ranging 450~550° C. In the exposing in the step (3), an UV ray of a wavelength in the vicinity of 250~380 $\mu$m, preferably at a light intensity of 5~10 mW/cm$^2$, is employed. The coating, drying, exposure and development used in the formation of the flourescent film are similar to the coating, drying, exposure and development used in a general semiconductor device fabrication process.

Examples of the present invention will be explained, which is illustrated as examples, but not to limit the scope of the present invention.

EXAMPLES 1 TO 4

A photopolymerization type photosensitive flourescent paste is prepared by mixing hydroxyethyl cellulose(called as 'HFC' hereafter), hydroxypropyl cellulose(called as 'HPC' hereafter), and a copolymer(called as 'DCP' hereafter) of acryl amide and diacetone acrylamide, as binder polymers of the photopolymerization type photosensitive flourescent paste for facilitating development using pure water, dimethylformamide(called as 'DMF' hereafter), N-methyl-2-pyrrolidone(called as 'NMP' hereafter) and 3-methoxy-3-methyl-butanol, as solvents, pentaerythritol triaczylate (called as 'PETA' hereafter) as a multifunctional monomer, 2-hydroxyethyl acrylate(called as 'HEA' hereafter) as singlefuuctional monomer, a brand name HSP-188 as an UV ray photoinitiator and a brand name BYK 320 as a smoother as shown in table 1.

The prepared photopolymerization type photosensitive flourescent paste is printed on an entire surface of a glass substrate having barriers formed thereon by a printer, heated and dried at 120° C. for 20 minutes, to vaporize and remove the solvent. Then, a mask is aligned to the glass substrate having the flourescent film coated thereon, and an UV ray is directed thereto at a light intensity 7 mW/cm$^2$ for 30 seconds. Pure water is used in removing non-exposed portions, dried, and a state of the formed flourescent film is examined using optical microscope, of which result is shown in table 1.

TABLE 1

Preparation of photopolymerizadon type photosensitive flourescent paste composition and Properties of flourescent film formed using the same.

| Example 1 | | Example 2 | | Example 3 | | Example 4 | |
|---|---|---|---|---|---|---|---|
| HEC (molecular weight 360,000) | 2 g | HPC (molecular weight 360,000) | 2 g | HPC (molecular weight) 80,000) | 10 g | ADCP | 15 g |
| DMF | 40 g | DMF | 40 g | 3-methoxy-3-methyl butanol | 40 g | NMP | 40 g |
| PETA | 5 g | PETA | 5 g | PETA | 5 g | PETA | 5 g |
| HEA | 5 g | HEA | 5 g | HEA | 5 g | HEA | 5 g |
| HSP-188 | 1 g | HSP-188 | 1 g | HSP-188 | 3 g | HSP-188 | 3 g |
| BYK 320 | 0.3 g | BYK 320 | 0.3 g | BYK 320 | 0.3 g | BYK 320 | 0.3 g |
| flourescent material | 30 g | flourescent material | 30 g | flourescent material | 30 g | flourescent material | 30 g |
| viscosity(cps) × 1000 | 18 | viscosity(cps) × 1000 | | viscosity(cps) × 1000 | 25 | viscosity(cps) × 1000 | 15 |
| thickness of flourescent film($\mu$m) | 30 | thickness of flourescent film($\mu$m) | 28 | thickness of flourescent film($\mu$m) | 32 | thickness of flourescent film($\mu$m) | 27 |

TABLE 1-continued

Preparation of photopolymerizadon type photosensitive flourescent paste composition and Properties of flourescent film formed using the same.

| Example 1 | | Example 2 | | Example 3 | | Example 4 | |
|---|---|---|---|---|---|---|---|
| fall off ratio of fluorescent film(%) | 0 | fall off ratio of fluorescent film(%) | 0 | fall off ratio of fluorescent film(%) | 1 | fall off ratio of fluorescent film(%) | 0 |
| sharpness(%) | 0.1 | sharpness(%) | 0.2 | sharpness(%) | 0.2 | sharpness(%) | 0.5 |

*Sharpness: an extent of deviation from a straight line at a boundary between an exposed portion and a non-exposed portion.

Figure 4:
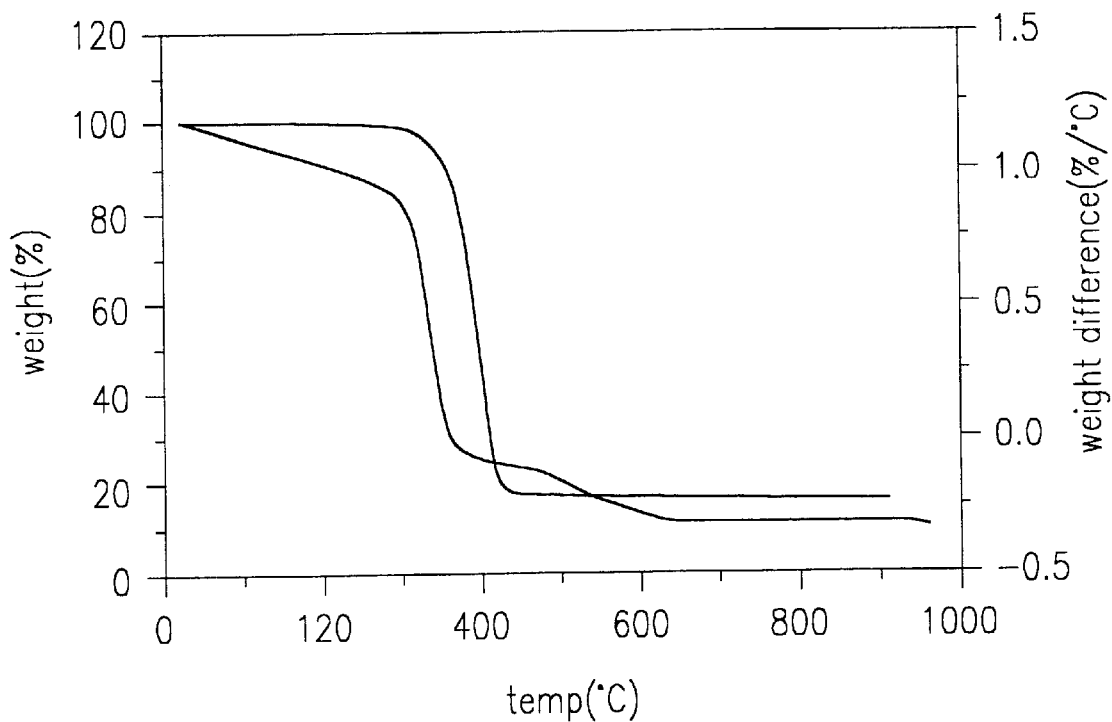

Upon summarizing the foregoing examples, a uniform flourescent film ranging 27~32 μm is obtained on a barrier sidewall and on the underelying glass substrate, a fall off ratio of the flourescent film is found to be below 1%, and a sharpness which is an extent of deviation from a straight line at a boundary betweeen an exposed portion and a non-exposed portion is also below ±1%. And, as shown in FIG. 4, as a result of TGA thermal analyses of baking temperatures, in comparison that the acrylate group binder polymer in comparative example 3 shows a maximum decomposition at a temperature approx. 394° C. because all the cellulose group binder polymers in examples 1, 2, 3 and 4 show a maximum decomposition at a temperature approx. 339° C., it is verified that a thermal alteration of the flourescent can be prevented in baking. And, though a viscosity of the photopolymerization type photosensitive flourescent paste having acrylate group binder polymer therein in the comparative example 3 is 15,000 cps when a content of the binder polymer is approx. 10%, as a viscosity of the photopolymerization type photosensitive flourescent paste having cellulose group binder polymer therein in the example 1, 2, 3 and 4 are 16,000cps when a content of the binder polymer is approx. 3%, showing that a higher viscosity can be obtained by a smaller amount of binder polymer, it is verified that a residual binder after baking can be mired.

Comparative Example 1

Preparation of photo cross-linking type photosensitive flourescent paste using PVA-ADC and properties of a flourescent film formed thereof.

4.26 g(5.4%) PVA with a molecular weight 77,000 is dissolved in 43 g(54.1%) pure water, 1.53 g(1.9%) of ADC as a photosensitizer, 0.53 g(0.7%) of dispersant, 0.1 g(0.1%) anti-foamer and 30 g(37.8%) flourescent material are mixed therein, and the flourescent material is distributed by a roll-mill, to prepare a photosensitive flourescent paste The prepared photosensitive flourescent paste is printed on an entire surface of a PDP glass substrate having barriers formed thereon by a printer, heated and dried to vaporize and remove water, a solvent. A mask is aligned on the glass substrate having the flourescent film coated thereon, an UV ray is directed thereto at a light intensity of 7 mW/cm² for 30 seconds, and a development is conducted using pure water. Upon examining the developed flourescent film pattern with an optical microscope, it is observed that the flourescent film formed at a surface of the barrier sidewall is not uniform and exposed portions of the flourescent film are fallen off by more than 20% because photo cross-linking is not made properly due to a film thickness on the underlying glass substrate.

Comparative Example 2

Preparation of photo cross-linking type photosensitive flourescent paste using PVA-DAST and properties of a flourescent film formed thereof. 5.00 g(6.1%) PVA with a molecular weight 77,000 is dissolved in45 g(55.0%) pure water, 1.50 g(1.8%) of DAST as a photosensitizer, 0.2 g(0.2%) of dispersant, 0.1 g(0.1%) anti-foamer and 30 g(36.7%) flourescent material are mixed therein, and the flourescent material is distributed by a roll-mill, to prepare a photosensitive flourescent paste, The prepared photosensitive flourescent paste is printed on an entire surface of a PDP glass substrate having barriers formed thereon by a printer, heated for 10 minutes to remove water, a solvent. A mask is aligned on the glass substrate having the flourescent film coated thereon, an UV ray is directed thereto at a light intensity of 7 mW/cm² for 30 seconds, and a development is conducted using pure water. Upon examining the developed flourescent film pattern with an optical microscope, it is observed that the flourescent film is formed at a surface of the barrier sidewall partially and exposed portions of the flourescent film are fallen off by more than 30%.

Comparative Example 3

As an acrylate group binder polymer having a carboxyl group, a copolymer of methylmethaacrylate and metacrylic acid having a repeat unit molar ratio 50:50 and a molecular weight 200,000 g/mole is used. A photopolymerization type photosensitive flourescent paste is prepared by mixing the copolymer 10 wt %, NMP 40 wt % as a solvent, pentaerythritol triacrylate 5 wt % and hydroxyethyl acrylate 5 wt % as multifunctional monomers, brand name HSP-188 from SK-UCB 3 wt % as a photoinitiator, flourescent material 36 wt %, and BYK 320 1 wt % as a smoother. The prepared photosensitive flourescent paste is printed oil an entire surface of a PDP glass substrate having barriers formed thereon by a printer, heated at 90° C. for 20 minutes to remove water, a solvent. A mask is aligned on the glass substrate having the flourescent film coated thereon, an UV ray is directed thereto at a light intensity of 7 mW/cm² for 30 seconds, and a development is conducted using pure water to fail. It is found that the development is done when sodium carbonate(Na₂CO₃) water solution of 1 wt % concentration is used. Upon examining the developed flourescent film pattern with an optical microscope, as it is observed that a uniform flourescent film is formed on the barrier sidewall and the underlying glass substrate, it is verified that formation of a flourescent film is easier than using the photo cross-linking type photosensitive flourescent paste of the first and second embodiments. However, as shown in FIG. 4, a TGA analysis of a flourescent film formed of photopolymerization type photosensitive flourescent paste having the acrylate group compolymer as the binder polymer shows a maximum decomposition temperature in the vicinity of 394° C., implying that a baking is required at a temperature higher than the photopolymerization type photosensitive flourescent paste in the fourth embodiment of the present invention, it is verified that there is a degradation of the flourescent film.

As has been explained, the photopolymerization type photosensitive phosphor paste composition, and the method for forming a fluorescent film in a plasma display panel by using the same have the following advantages.

Different from the related art photosensitive flourescent paste, as the photopolymerization type photosensitive flourescent paste of the present invention can be developed by pure water, the paste is environment friendly and has a low baking temperature, that permits an easy flourescent film formation, the present invention is suitable for formation of a flourescent film for a large sized screen over 40" and an HDTV PDP.

It will be apparent to those skilled in the art that various modifications and variations can be made in the photopolymerization type photosensitive flourescent paste composition and the method for forming a fluorescent film in a plasma display panel by using the same of the present invention without departing from the spirit or scope of the invention. Thus, it is intended that the present invention cover the modifications and variations of this invention provided they come within the scope of the appended claims and their equivalents.

What is claimed is:

1. A method for forming a flourescent film in a PDP by using a photopolymerizable photosensitive flourescent paste composition, comprising:

preparing red, green and blue photopolymerizable photosensitive flourescent paste composition comprising water soluble binder polymer 1~15 wt %, multifunctional oligomer 3~7 wt %, photoinitiator 1~3 wt %, a solvent which can dissolve the binder polymer 20~35 wt %, additive 0.1~1 wt %, water, and flourescent material 25~35 wt % respectively, wherein the multifunctional oligomer comprises polyethylene glycol bisacrylate with a molecular weight ranging from 200 to 500 or polypropylene glycol bismethacrylate with a molecular weight ranging from 200 to 500;

coating one of the prepared red, green and blue photopolymerizable photosensitive flourescent paste compositions on a glass substrate having barriers formed thereon;

drying the coated composition;

exposing the dried composition and developing with water to form a first flourescent film;

coating one of the non-coated compositions on the glass substrate, drying the coated composition and exposing and developing the dried composition to form a second flourescent film;

coating the remaining non-coated compositions on the glass substrate, drying the coated composition and exposing and developing the dried composition to form a third flourescent film; and, baking the glass substrate having the first, second and third flourescent films formed thereon.

2. A method as claimed in claim 1, wherein the photopolymerization type photosensitive flourescent paste composition is deposited to a thickness of 30~70 $\mu$m when the composition is coated on the glass substrate.

3. A method as claimed in claim 1, wherein drying the coated composition is conducted by heating at a temperature ranging 100~140° C. for 10~30 minutes.

4. A method as claimed in claim 1, wherein the dried composition is exposed for 20~60 seconds using a light of a wavelength in the vicinity of 250~380 nm at a light intensity of 5~1 mW/cm$^2$.

5. A method as claimed in claim 4, wherein the light is ultraviolet.

* * * * *